United States Patent
Teng

(10) Patent No.: US 10,468,684 B2
(45) Date of Patent: Nov. 5, 2019

(54) MANGANESE OXIDE COMPOSITIONS AND THEIR USE AS ELECTRODES FOR AQUEOUS PHASE ENERGY STORAGE DEVICES

(71) Applicant: The University of New Hampshire, Durham, NH (US)

(72) Inventor: Xiaowei Teng, Durham, NH (US)

(73) Assignee: The University of New Hampshire, Durham, NH (US)

(*) Notice: Subject to any disclaimer, the term of this patent is extended or adjusted under 35 U.S.C. 154(b) by 55 days.

(21) Appl. No.: 14/737,823

(22) Filed: Jun. 12, 2015

(65) Prior Publication Data

US 2015/0360968 A1 Dec. 17, 2015

Related U.S. Application Data

(60) Provisional application No. 62/011,210, filed on Jun. 12, 2014.

(51) Int. Cl.
*H01M 4/62* (2006.01)
*H01G 11/46* (2013.01)
(Continued)

(52) U.S. Cl.
CPC ............ *H01M 4/625* (2013.01); *C01G 45/02* (2013.01); *C01G 51/00* (2013.01); *C01G 53/00* (2013.01); *H01G 11/46* (2013.01); *H01G 11/68* (2013.01); *H01G 11/86* (2013.01); *H01M 4/50* (2013.01); *H01M 10/36* (2013.01);
(Continued)

(58) Field of Classification Search
CPC ...... H01M 4/587; H01M 4/625; H01M 4/505; H01G 11/52; H01G 11/62; H01G 11/46; H01G 11/66; H01G 9/035; H01G 9/145; H01G 9/02; H01G 9/042; C01G 53/40;
(Continued)

(56) References Cited

U.S. PATENT DOCUMENTS 7,625,673 B2 * 12/2009 Kudo .................... H01G 9/155
429/218.1
8,115,587 B2   2/2012 Koto et al.
(Continued)

FOREIGN PATENT DOCUMENTS

WO    2005001954    1/2005
WO    2013127920    9/2013
WO    2014036513    3/2014

OTHER PUBLICATIONS

Liu et al. ("Single Crystal (Mn,Co)3O4 Octahedra for Highly Efficient Oxygen Reduction Reactions," Electrochimica Acta, 2014, vol. 144, pp. 31-41.).*
(Continued)

*Primary Examiner* — Miriam Stagg
*Assistant Examiner* — Claire L Roe
(74) *Attorney, Agent, or Firm* — Steven J. Grossman; Grossman, Tucker, Perreault & Pfleger PLLC

(57) ABSTRACT

A composition and method of preparation of mixed valence manganese oxide, nickel-doped mixed valence manganese oxide and cobalt-doped mixed valence manganese oxide nanoparticles as well as tri-manganese tetroxide, nickel-doped tri-manganese tetroxide and cobalt-doped tri-manganese tetroxide nanoparticles for use as electrodes for aqueous energy storage devices.

11 Claims, 20 Drawing Sheets

(51) Int. Cl.
C01G 45/02 (2006.01)
C01G 51/00 (2006.01)
C01G 53/00 (2006.01)
H01M 4/50 (2010.01)
H01M 10/36 (2010.01)
H01G 11/68 (2013.01)
H01G 11/86 (2013.01)

(52) U.S. Cl.
CPC ...... C01P 2002/50 (2013.01); C01P 2002/54 (2013.01); C01P 2002/72 (2013.01); C01P 2002/80 (2013.01); C01P 2004/04 (2013.01); C01P 2004/64 (2013.01); C01P 2006/40 (2013.01); H01M 2300/0002 (2013.01); Y02E 60/13 (2013.01); Y10T 428/2982 (2015.01)

(58) Field of Classification Search
CPC ... C01G 51/40; C01P 2004/64; C01P 2006/40
USPC .......... 429/218.1, 499, 231.8, 188; 502/150, 502/152; 252/506
See application file for complete search history.

(56) References Cited

U.S. PATENT DOCUMENTS 8,298,706 B2  10/2012  Christian et al.
2004/0247988 A1* 12/2004 Ovshinsky ........... B01J 23/8892
                                                      429/499
2012/0156582 A1  6/2012  Tao et al.
2013/0064972 A1  3/2013  Koyanaka et al.

OTHER PUBLICATIONS

Le "Chemical Vapor Synthesis and Characterization of Manganese Oxides" Chemical Vapor Deposition, vol. 17, 2011 (Year: 2011).*

International Search Report and Written Opinion issued in International Patent Application No. PCT/US2015/035522 dated Jun. 12, 2015 (5 pages).

(Savic, SM et al.) Far Infrared and Microstructural Studies of Mechanically Activated Nickel Manganite. Ceramics International. Published Jul. 24, 2012, p. 1241, col. 2, paragraph 2; p. 1242, col. 1, paragraphs 1-3.

(Staiti, P et al.) Study and Optimisation of Manganese Oxide-based Electrodes for Electrochemical Supercapacitors. Journal of Power Sources. Published Nov. 5, 2008; abstract; p. 286; col. 1, paragraphs 2-3; p. 287, figures 2a-f.

(Wang, ZL et al.) Valence State Mapping of Cobalt and Manganese Using Near-Edge Fine. Micron. Published 2000; 8 pages.

* cited by examiner

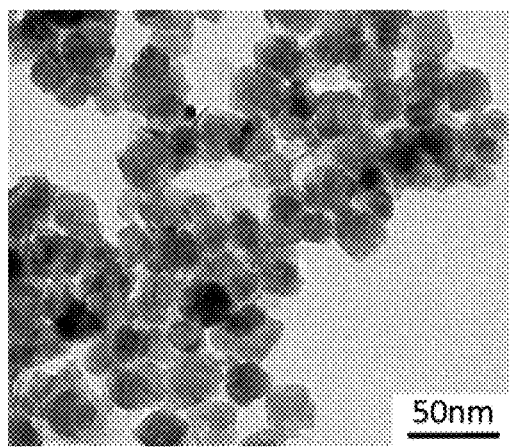 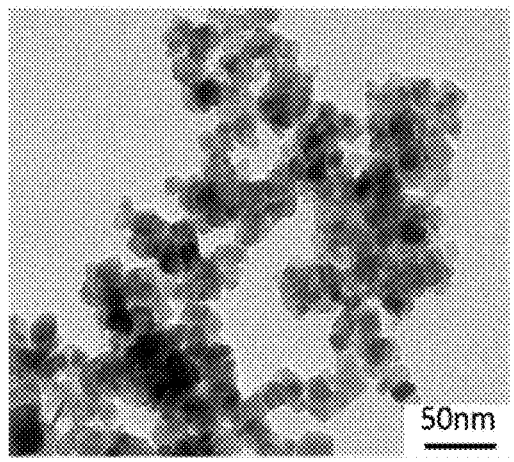
FIG. 12A                    FIG. 12B

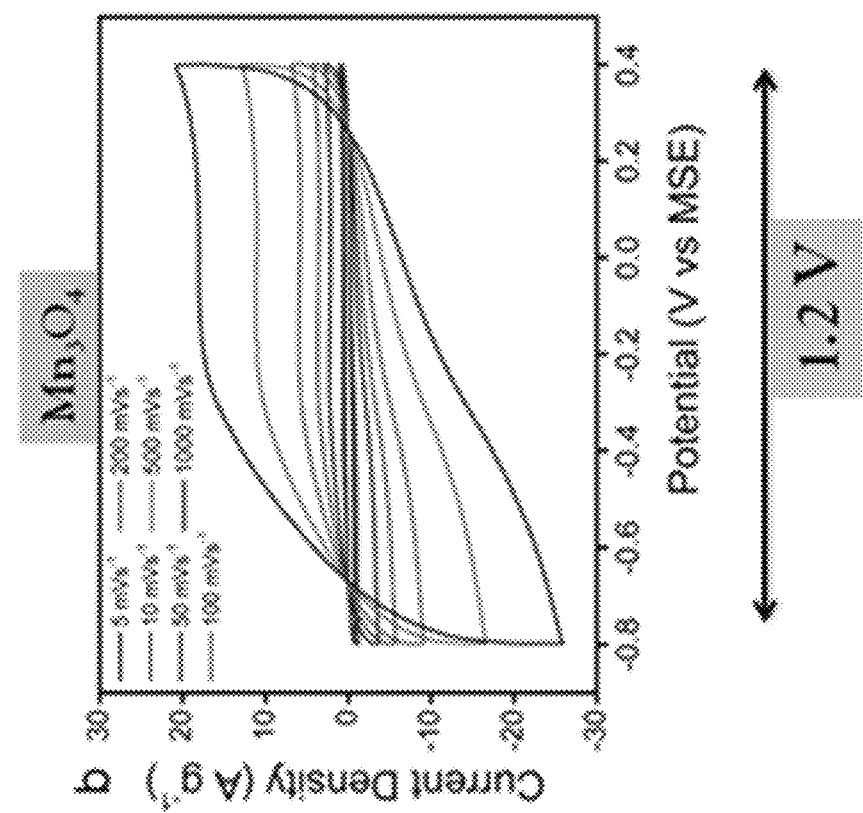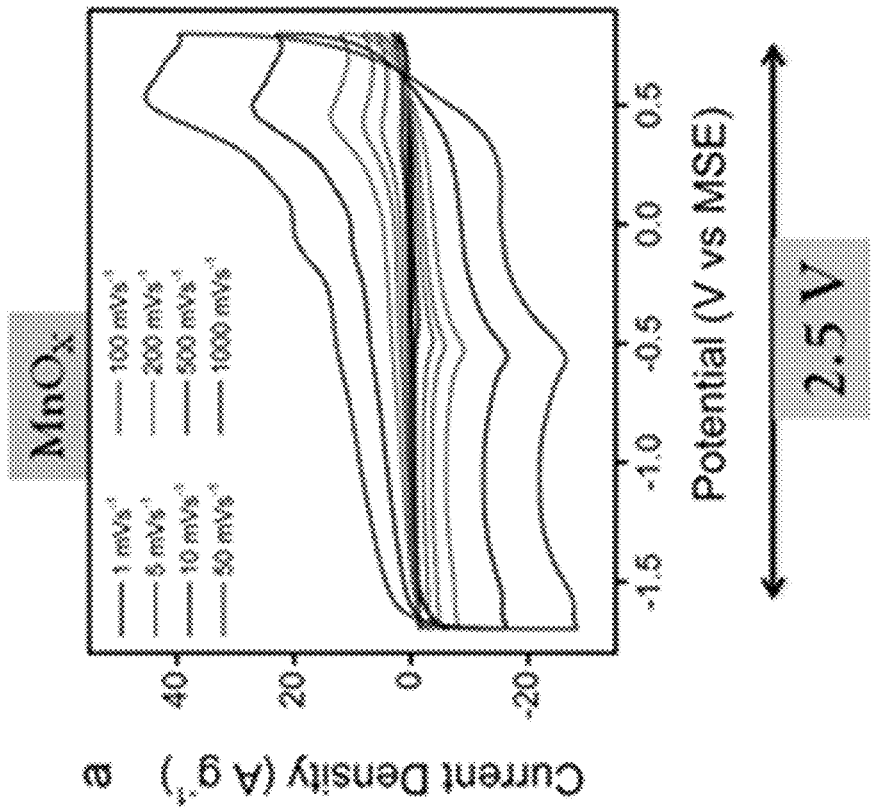
FIG. 15

MANGANESE OXIDE COMPOSITIONS AND THEIR USE AS ELECTRODES FOR AQUEOUS PHASE ENERGY STORAGE DEVICES

CROSS-REFERENCE TO RELATED APPLICATIONS

This application claims the benefit of U.S. Provisional Patent Application Ser. No. 62/011,210, filed on Jun. 12, 2014, which is fully incorporated herein by reference.

GOVERNMENT FUNDED RESEARCH

The presently claimed invention relies on data and discoveries originating from research funded by the U.S. Department of Energy, under grant no. DE-SC0010286.

TECHNICAL FIELD

The present invention relates to preparation of manganese oxide materials for use as electrode and more particularly, to $Mn_3O_4$, cobalt-doped $Mn_3O_4$, or nickel-doped $Mn_3O_4$ for use in aqueous phase energy storage devices including batteries and electrochemical capacitors. The present invention therefore relates in general to preparation of electrodes containing manganese oxide MnOx wherein Mn is present as a mixture of three oxidation states, 2+, 3+ and 4+ as well as cobalt doped (Co—MnOx) wherein Mn and Co are present as a mixture of three oxidation states 2+, 3+ and 4+ and nickel doped (Ni—MnOx) where Mn is present as a mixture of three oxidation states 2+, 3+ and 4+ and Ni is present at an oxidation state of 2+.

BACKGROUND INFORMATION

It is projected that world energy consumption will double by 2050. Adoption of renewable energy with non- or reduced-carbon emission on a global scale offers the potential to reduce our national dependence on petroleum and significantly reduce gas emissions. Installation of small-scale (e.g., home-own) stationary renewable energy harvesting and generation devices (such as solar panels, wind turbines, and fuel cell devices) has been growing worldwide, particularly in the US. Renewable energy sources, especially those from sun and wind, generally do not meet on-peak and off-peak load demands. As a result, accompanying with these small-scale energy harvest/generation devices, there is a strong need for small- or intermediate-size (rechargeable) energy storage capability, so that electricity generated during off-peak hours can be stored efficiently and economically for later use during peak demand.

Current energy storage systems are largely classified as non-aqueous storage devices because of the usage of non-aqueous organic electrolytes, which can achieve a wide voltage window (usually >3.0 V) and thus high energy density. However, non-aqueous energy storage systems (lithium-ion batteries (LIBs)) suffer from poor safety, high costs and low conductivity.

Chemical energy storage devices for use with stationary energy harvest and generation devices (such as solar panels, wind turbines) have historically been based on the lead acid batteries (LABs). LABs have several advantageous characteristics for energy storage such as ease of manufacture, high specific power density, capability of high discharge currents. In particular, aqueous electrolytes used in LABs are generally inexpensive and electrode drying is unnecessary, and hence the cost of cell packaging is dramatically lower than those for non-aqueous electrolytes. LABs are also commonly used for automobile ignition, in back-up power supplies for alarm, and smaller computer systems as uninterruptible power supplies (UPS). Large LABs are also used to power the electric motors in diesel-electric submarines when submerged, and to act as emergency power in nuclear submarines. Given the broad applications, however, there are several problems associated with LABs, such as low energy density, limited life cycle, and use of non-environmentally friendly toxic and hazardous materials such as lead and sulfuric acid.

Transition metal oxides (TMOs) are promising electrode materials in aqueous phase electrochemical energy storage, because of their large capacitance properties and potential for multi-electron transfer during Faradaic reactions. $RuO_2$ is the best known TMO that exhibits long cycle life and good proton conductance, with reported gravimetric capacitances of ~1200 F/g. However, the relatively high cost of Ru (~$70 per troy ounce; price as of June 2014) limits its realistic commercial applications. Many inexpensive TMOs, including $V_2O_5$, NiO, $MnO_2$, $Co_3O_4$ and $TiO_2$, have also been studied for energy storage applications. Among them, manganese has received growing interest due to its low cost and environmental soundness. Although manganese oxides ($MnO_x$) possess a theoretical capacitance of ~800 F/g based on one-electron-transfer redox reactions and 1.0 V potential window, $MnO_x$ powders with different valence states have systematically exhibited much lower specific capacitances (~100 F/g) and shorter cycle life compared to $RuO_2$.

Due to the dispersive nature of the nanocomposites, separate paths for ion and charge transport may be present between the metal oxide nanocrystals and the hydrate providing paths for long range electronic and ionic conduction, respectively. The electrochemical response of a material relates to its structure, which in turn, is dependent on material's morphology and composition. Thus, it is critical that the complicated redox processes of aqueous energy storage should be understood at the nanoscale level using new capabilities in materials synthesis and structure characterization.

Accordingly, there is a need for new energy storage devices that are relatively inexpensive, can work at relatively wide voltage window and current density with long life cycles, and are safe, non-hazardous, and environmentally sound.

SUMMARY

There are now described new materials for the preparation of electrodes for aqueous electrolyte energy storage devices that are relatively easy and inexpensive to prepare, susceptible to large scale manufacturing, and environmentally sound. The present invention contemplates compositions and methods of preparing manganese nanoparticles, such as tri-manganese tetroxide ($Mn_3O_4$), cobalt-doped, tri-manganese tetroxide $Co_xMn_{3-x}O_4$ and nickel-doped, tri-manganese tetroxide $Ni_xMn_{3-x}O_4$ nanoparticles where "x" can have a value of 0.1 to 0.75. The compositions may be obtained by reacting a manganese (II) salt, and optionally a cobalt (II) salt or nickel (II) salt, with an alkali base in the open air environment at room temperature using a semi-batch reactor. The final product is collected via centrifuge, air-dried, followed by a relatively low temperature calcination (thermal treatment in air or oxygen) at temperatures of 50° C. to 200° C. The resulting $Mn_3O_4$, $Co_xMn_{3-x}O_4$, or $Ni_xMn_{3-x}O_4$ nanoparticles have diameters in the range of 10 to 30 nm.

After mixing with carbon black, the $Mn_3O_4$, $Co_xMn_{3-x}O_4$, or $Ni_xMn_{3-x}O_4$ nanoparticles can be employed as an electrode material for aqueous energy storage devices with a potential window of up to 2.7 V with very long cycle life, such as at or above 10000 cycles.

The present invention also stands directed at a composition comprising nanoparticles for use in forming an electrode of mixed valence oxides of the formula MnOx wherein Mn has a valence of 2+, 3+ and 4+ where x has a value between 1 and 2 and having an average particle size of 10 nm to 50 nm. In addition, the mixed valence oxides of MnOx can be doped with cobalt wherein Mn and Co are present as a mixture of valence states of 2+, 3+ and 4+, or doped with nickel wherein Mn has a mixture of valences of 2+, 3+ and 4+ and Ni has a valence of 2+. The compositions may be obtained by reacting a manganese (II) salt, and optionally a cobalt (II) salt or nickel (II) salt, with an alkali base in the open air environment at room temperature using a semi-batch reactor. The final product is collected via centrifuge, air-dried, followed by a relatively high temperature calcination (thermal treatment in air or oxygen) at temperatures of 200° C. to 400° C. After mixing with carbon black, the mixed valence oxides of MnOx and the corresponding Ni and Co doped nanoparticles can be employed as an electrode material for aqueous energy storage devices with a potential window of up to 3.0 V with very long cycle life, such as at or above 10000 cycles.

BRIEF DESCRIPTION OF THE DRAWINGS

These and other features and advantages will be better understood by reading the following detailed description, taken together with the drawings wherein:

FIG. 9A presents the 1st to 10th charge-discharge cycles, and FIG. 9B presents the 91st to 100th charge-discharge cycles.

FIG. 12A is a TEM image of the mixed valence oxide with cobalt doping comprising $Co_{0.1}Mn_{2.9}Ox$.

FIG. 12B is a TEM image of the mixed valence oxide with nickel doping comprising $Ni_{0.1}Mn_{2.9}O_x$.

FIG. 15 illustrates cyclic voltammetries (CVs) of graph (a) $MnO_X$ and graph (b) commercial $Mn_3O_4$ carried on a three-electrode half-cell in 0.1 M $Na_2SO_4$ electrolyte at various scan rates using a mercury sulfate reference electrode (MSE). As illustrated, the $MnO_X$ nanoparticles exhibit a stable potential window of 2.5 V, while commercial $Mn_3O_4$ bulk materials (with a size large than 200 nm) can only be operated under 1.2 V.

DETAILED DESCRIPTION

Figure 1:
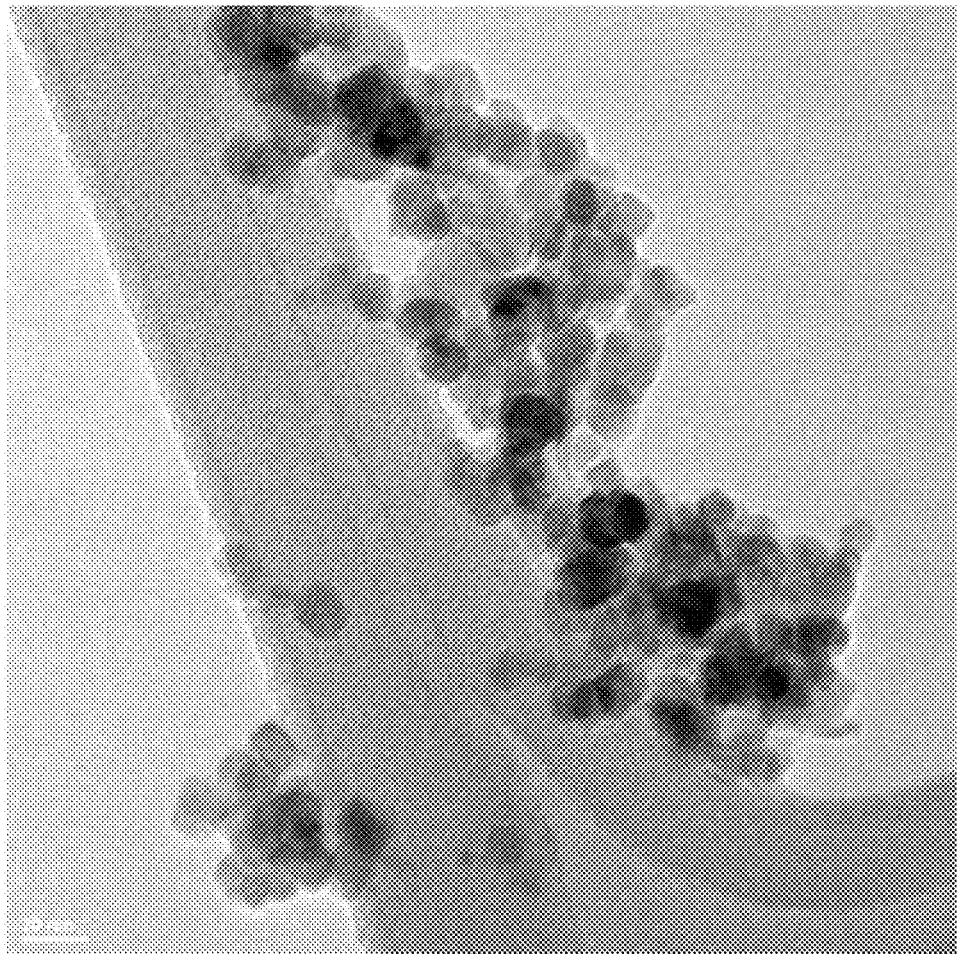
FIG. 1 is an image of $Mn_3O_4$ nanoparticles by transmission electron microscopy (TEM).

There are now provided details for the preparation of manganese nanoparticles, such as nanoparticles of tri-manganese tetroxide ($Mn_3O_4$), cobalt-doped tri-manganese tetroxide $Co_xMn_{3-x}O_4$ and nickel-doped tri-manganese tetroxide $Ni_xMn_{3-x}O_4$ (x: 0.1, 0.5, 0.75).

Compounds of manganese in the +2, +3, +4, +5, +6 and +7 oxidation states are known, but many are unstable in the solid state. The $Mn^{4+}$ ($Mn^{IV}$) is known to be stable in the solid state, therefore, manganese dioxide ($MnO_2$) has been used as a main material for energy storage devices for many years. In addition to $MnO_2$, manganese oxide compounds ($Mn_3O_4$) are also widely used as electrode materials, especially lithium manganese oxide compounds such as $Li_{1+x}Mn_{2-x}O_{4+y}$ have been used as positive electrode material (cathode) for rechargeable lithium-ion batteries. Typically, these compounds are formed by calcination (thermally heating) of a mixture of a manganese source compound (e.g., manganese carbonate [$MnCO_3$] and manganese dioxide [$MnO_2$]) and a lithium source compound at elevated temperatures (between 700 and 900° C.), resulting in the particles size with micrometer size and wide size distribution.

According to a preferred embodiment of the invention, the tri-manganese tetroxide nanoparticles, cobalt-doped manganese oxide nanoparticles, and nickel-doped manganese oxide nanoparticles may be prepared by the following general reaction scheme:

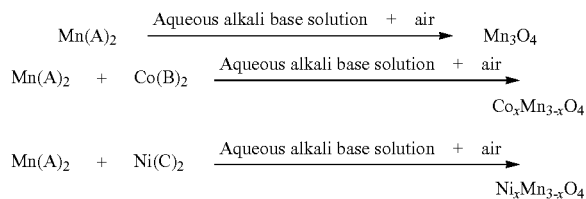

In the above equation, A may be any halide such as Cl⁻ or $(NO_3)^-$, and B or C can be Cl⁻, $(NO_3)^-$, $(SO_4)^{2-}$ or $(C_{10}H_{14}O_4)^{2-}$ (acetylacetonate). The value of "x" is from 0.1 to 0.75.

As noted, the reaction is preferably carried out in a semi-batch reactor containing Mn and Ni aqueous salt solutions with a controlled addition of an aqueous base solution such as KOH or NaOH. In a semi-batch reactor, the manganese (II) salt, and optionally a cobalt (II) salt or nickel(II) salt, is dissolved in water inside the reactor under vigorous stirring, while an aqueous alkali base solution is slowly injected into the reactor via a syringe pump. The design of semi-batch reactor allows the fine control of the nucleation and growth of the $Mn_3O_4$, $Co_xMn_{3-x}O_4$ or $Ni_xMn_{3-x}O_4$ nanoparticles. The resulting precipitates are collected and thermally treated (heating to 200° C. to 400° C.). As noted, the value of "x" in $Co_xMn_{3-x}O_4$ or $Ni_xMn_{3-x}O_4$ can range from 0.1 to 0.75 and all or any increments in between. Accordingly, one may form any of the following compounds: $Co_{0.1}Mn_{2.9}O_4$, $Co_{0.5}Mn_{2.5}O_4$, $Co_{0.75}Mn_{2.25}O_4$, $Ni_{0.1}Mn_{2.9}O_4$, $Ni_{0.5}Mn_{2.5}O_4$, and $Ni_{0.75}Mn_{2.25}O_4$.

Preferably, the above is achieved by first mixing a manganese (II) precursor salt as a 50 mM solution, such as $MnCl_2$, and a cobalt (II) precursor salt or nickel (II) precursor salt in a 10 mM solution, such as $Co(NO_3)_2$ or $Ni(NO_3)_2$, in water at room temperature under an open air environment and relatively vigorous stirring. The reaction volume can be easily scaled from 50 mL to 1000 mL. An alkali base, such as a solution of 250 mM KOH or NaOH (pH=13.4), is added to the metal precursor solution within 30 to 60 minutes at a constant flow rate. The resulting precipitate was permitted to stand for an additional 30 minutes at room temperature with stirring. The resulting product was then centrifuged and washed thoroughly with $H_2O$, air-dried, then calcination takes place under air by thermally treating at 100° C. for 2 hours. Optionally, other suitable temperatures may be selected between 50° C. and 200° C. The final products are $Mn_3O_4$, or optionally $Co_xMn_{3-x}O_4$, or $Ni_xMn_{3-x}O_4$ (where x may be 0.1, 0.5, or 0.75) spinel-type nanoparticles, such as $Co_{0.3}Mn_{2.5}O_4$ or $Ni_{0.5}Mn_{2.5}O_4$, with a purity of 95.0-100%, at a particle size of 10 nm to 30 nm. The particles were preferably found to have an average particle size of 17 nm with a variation of +/−7 nm.

The electrode materials are prepared by mixing 60% to 90% weight percent (preferably 80%) of $Mn_3O_4$, $Co_xMn_{3-x}O_4$ or $Ni_xMn_{3-x}O_4$ nanoparticles with 10% to 40% weight percent (preferably 20%) of carbon black (commercial carbon black with sizes ranging from 30 nm to 100 nm and a surface area of 75 m²/gram) and then copious amount of water to form final ink slurry. In a typical preparation, 0.8 gram of $Mn_3O_4$, $Co_xMn_{3-x}O_4$ or $Ni_xMn_{3-x}O_4$ nanoparticles and 0.2 gram of acetylene carbon black are mixed with about 3 gram of water, and sonicated for 15 minutes to form the ink slurry.

Suitable manganese (II) precursor salt compounds may include $MnCl_2$ or $Mn(NO_3)_2$. Suitable cobalt (II) precursor salt compounds may include $Co(NO_3)_2$, $CoSO_4$, or $CoCl_2$. Suitable nickel (II) precursor salt compounds may include $Ni(NO_3)_2$, $NiSO_4$, $C_{10}H_{14}NiO_4$, or $NiCl_2$. Suitable manganese (II) precursor salt solution concentrations may be selected from the range of 25 mM to 100 mM, and all or any increments in between, such as 50 mM. Suitable cobalt (II) precursor or nickel (II) precursor salt solution concentrations may be selected from the range of 2 mM to 10 mM, and all or any increments in between, such as 5 mM.

Crystalline nanoparticles of $Mn_3O_4$, $Co_xMn_{3-x}O_4$ and $Ni_xMn_{3-x}O_4$ (x at a value of 0.1 to 0.75) can now be prepared with relatively high purity (99%-100%) and substantially free of other oxidation states, such as $Mn_2O_3$ or $MnO_2$. Substantially free means that other manganese oxidation state impurities (manganese oxides other than $Mn_3O_4$) may be detected by X-ray diffraction from 1% (weight) and up to a maximum of 5% (weight), and any increments in between at 0.1% difference, such as 1.1% (weight), 1.2% (weight) etc., up to 5.0% (weight).

For the preparation of cobalt-doped, tri-manganese tetroxide nanoparticles the molar ratio of the precursors in the preferred procedure (e.g. $MnCl_2$:$Co(NO_3)_2$) above may vary from about 29:1 to 3:1; For the preparation of nickel-doped, tri-manganese tetroxide nanoparticles the molar ratio of the precursors in the preferred procedure (e.g. $MnCl_2$:$Ni(NO_3)_2$) above may vary from about 29:1 to 3:1.

According to an embodiment of the invention, aqueous energy storage devices may include two current collectors (such as carbon paper, copper foil or stainless steel foil), a separator (commercial Whatman cellulose filter paper), and a carbon black/metal oxides composition prepared as described above deposited on one side of each current collector, wherein the metal oxide is a $Mn_3O_4$, $Co_xMn_{3-x}O_4$ or $Ni_xMn_{3-x}O_4$ (where x may be 0.1, 0.5, or 0.75) nanoparticle. For a button cell, 3 to 7 mg of the $Mn_3O_4$/Carbon black, $Co_xMn_{3-x}O_4$/Carbon black or $Ni_xMn_{3-x}O_4$/Carbon black may be applied as electrode on each current collector. The electrolyte may include the aqueous KCl (from 0.1 M to 4 M), $Na_2SO_4$ (from 0.1 M to 3 M), and $K_2SO_4$ (from 0.1 M to 0.5 M). Other suitable electrolytes may be selected form $KNO_3$, NaCl, and $NaNO_3$, and more commonly a mixture of KCl and $Na_2SO_4$.

Figure 2:
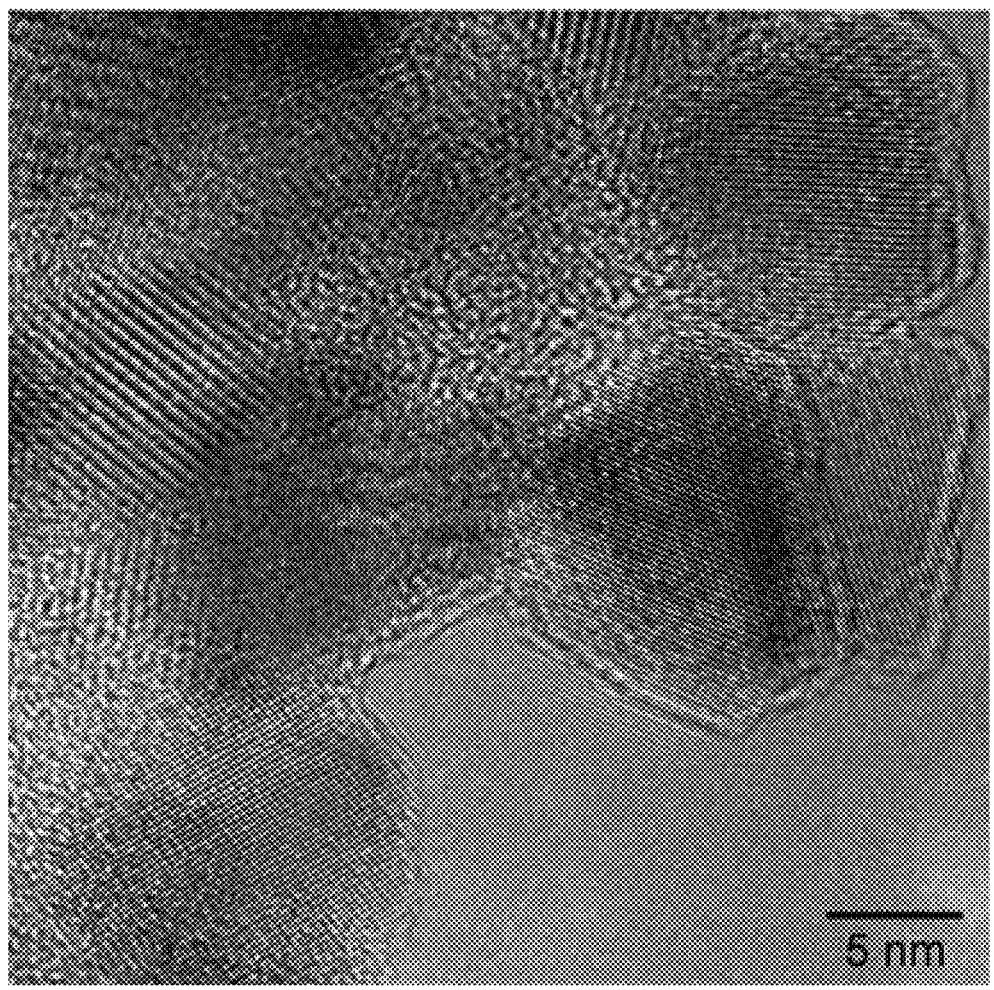
FIG. 2 is an image of $Mn_3O_4$ nanoparticles by high resolution TEM.
Figures 3A, 3B:
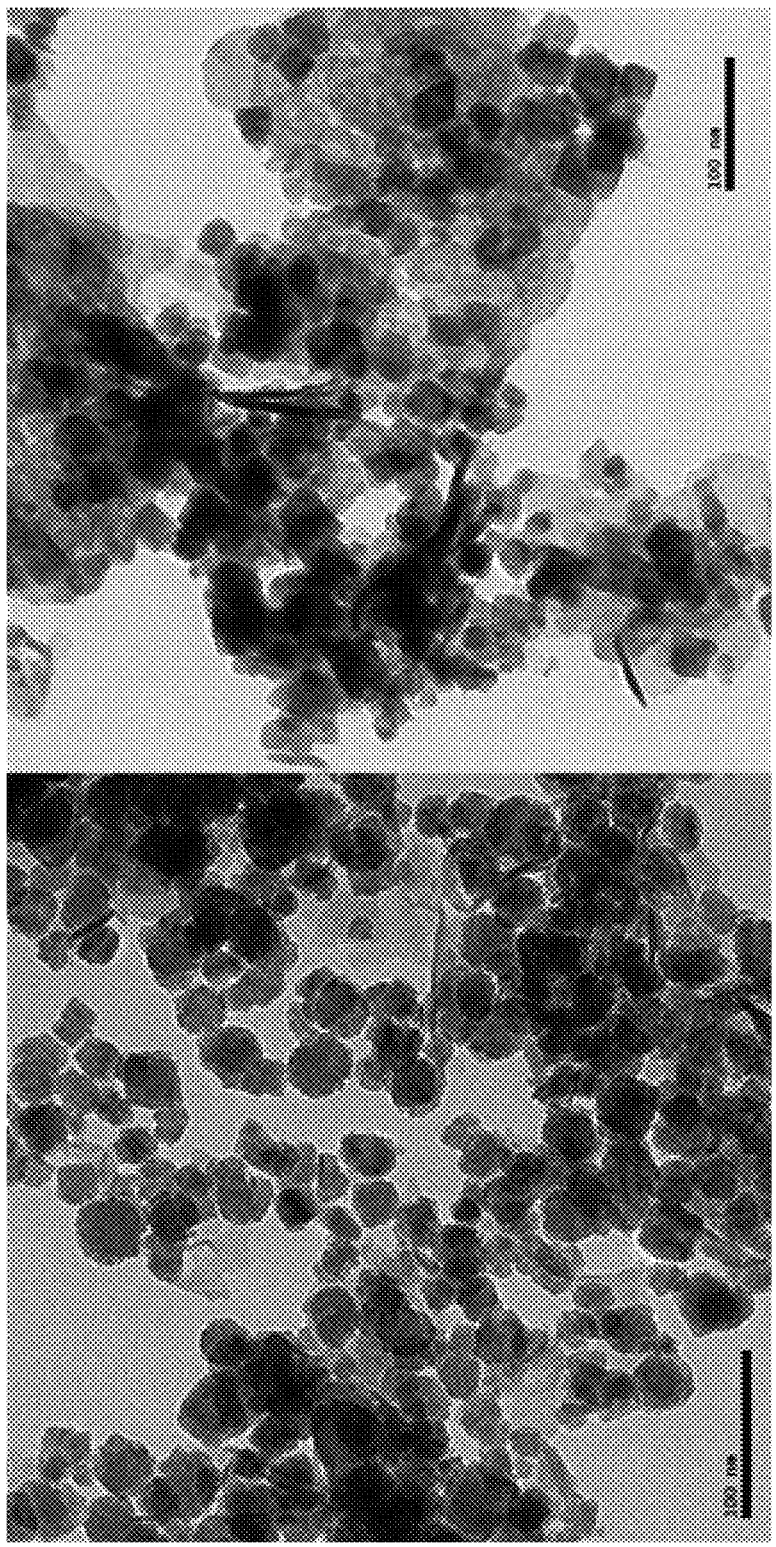
FIGS. 3A and 3B are images of $Co_{0.1}Mn_{2.9}O_4$ (3A) and $Ni_{0.1}Mn_{2.9}O_4$ (3B) nanoparticles by TEM.

FIGS. 1 and 3 are TEM images of $Mn_3O_4$, $Co_{0.1}Mn_{2.9}O_4$ and $Ni_{0.1}Mn_{2.9}O_4$ nanoparticles prepared according to the procedures described above. All the materials show similar morphologies of nanoparticles with diameters ranging from 10 nm to 30 nm. High resolution TEM image shown in FIG. 2 demonstrates that the $Mn_3O_4$ nanoparticles show a highly crystalline structure with distinct lattice fringes.

Figure 4:
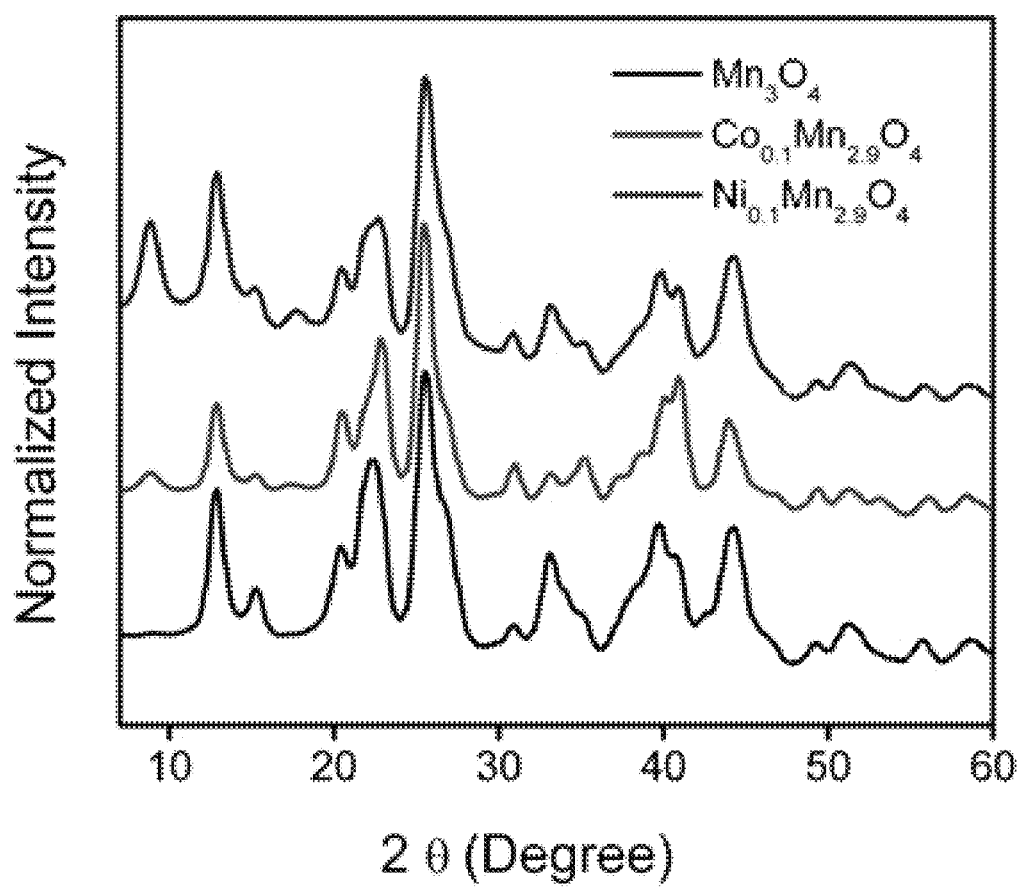
FIG. 4 is a plot of X-ray diffraction (XRD) data of $Mn_3O_4$, $Co_{0.1}Mn_{2.9}O_4$ and $Ni_{0.1}Mn_{2.9}O_4$.

FIG. 4 shows X-ray diffraction (XRD) data of $Mn_3O_4$, $Co_{0.1}Mn_{2.9}O_4$ and $Ni_{0.1}Mn_{2.9}O_4$ nanoparticles. All three materials show very similar XRD patterns. All the diffraction peaks can be perfectly indexed to the tetragonal cell of the $Mn_3O_4$ spinel-type structure, corresponding to the well-defined data shown in Joint Committee on Powder Diffraction Standards (JCPDS number: 24-0734).

Figure 5A:
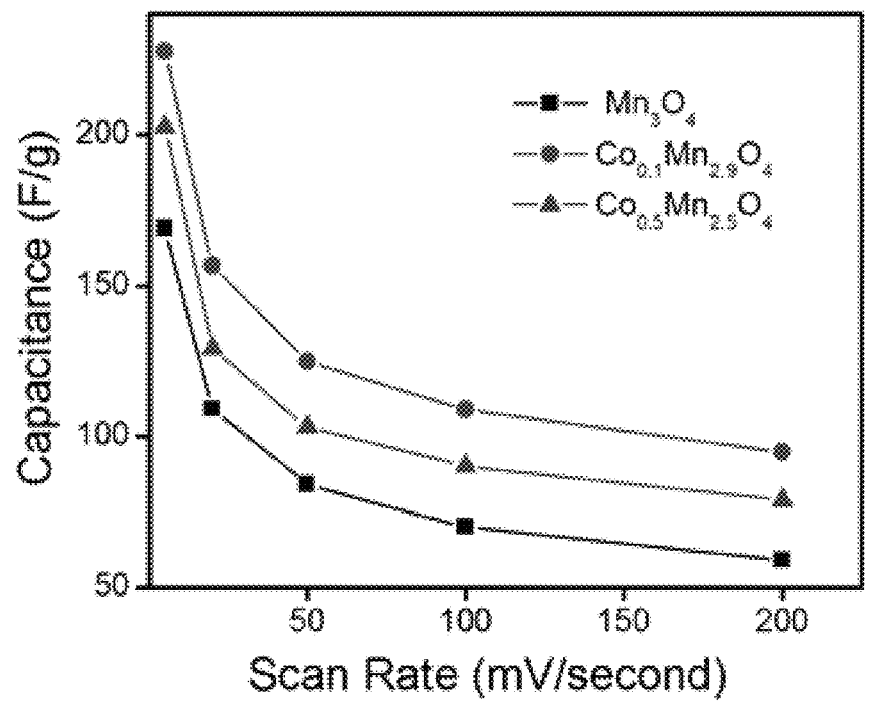
FIGS. 5A and 5B are plots of capacitance vs. scan rates of $Mn_3O_4$ and $Co_xMn_{3-x}O_4$ (x: 0.1, 0.5) (5A) $Mn_3O_4$ and $Ni_xMn_{3-x}O_4$ (x: 0.1, 0.5, 0.75) (5B) from half-cell cyclic voltammetry measurements.
Figure 5B:
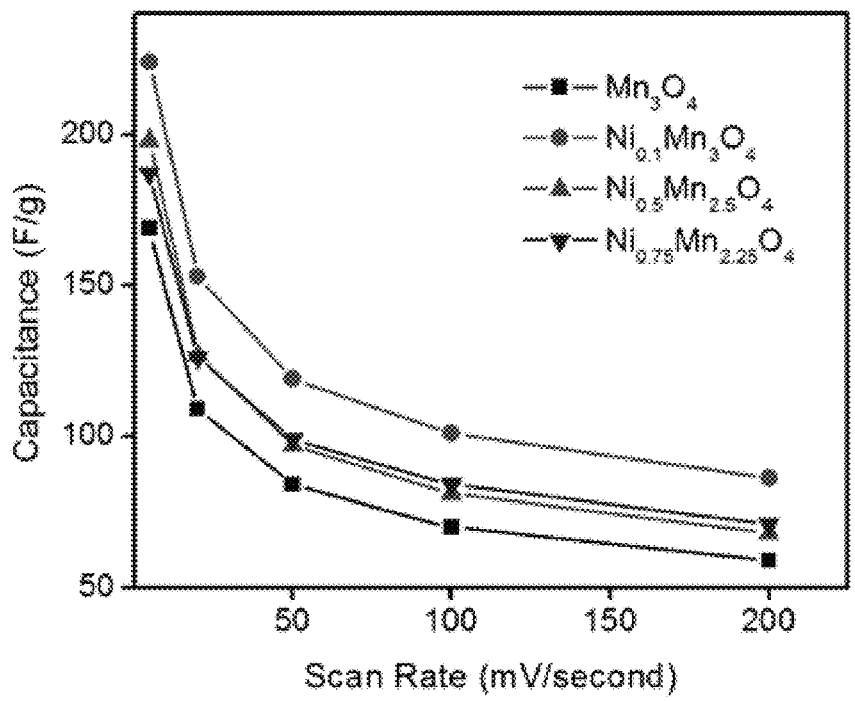

FIG. 5 shows the plots of gravimetric capacitance as a function of scan rates of $Mn_3O_4$, $Co_xMn_{3-x}O_4$ (x: 0.1, 0.5) and $Ni_xMn_{3-x}O_4$ (x: 0.1, 0.5, 0.75) nanoparticles. The measurements are conducted using a three-electrode half-cell between 0 V and 0.9 V (vs. Ag/AgCl) in a 0.1M $Na_2SO_4$ electrolyte. Data show that addition of Co or Ni components into $Mn_3O_4$ spinel structure increase its capacitance considerably.

Figure 6:
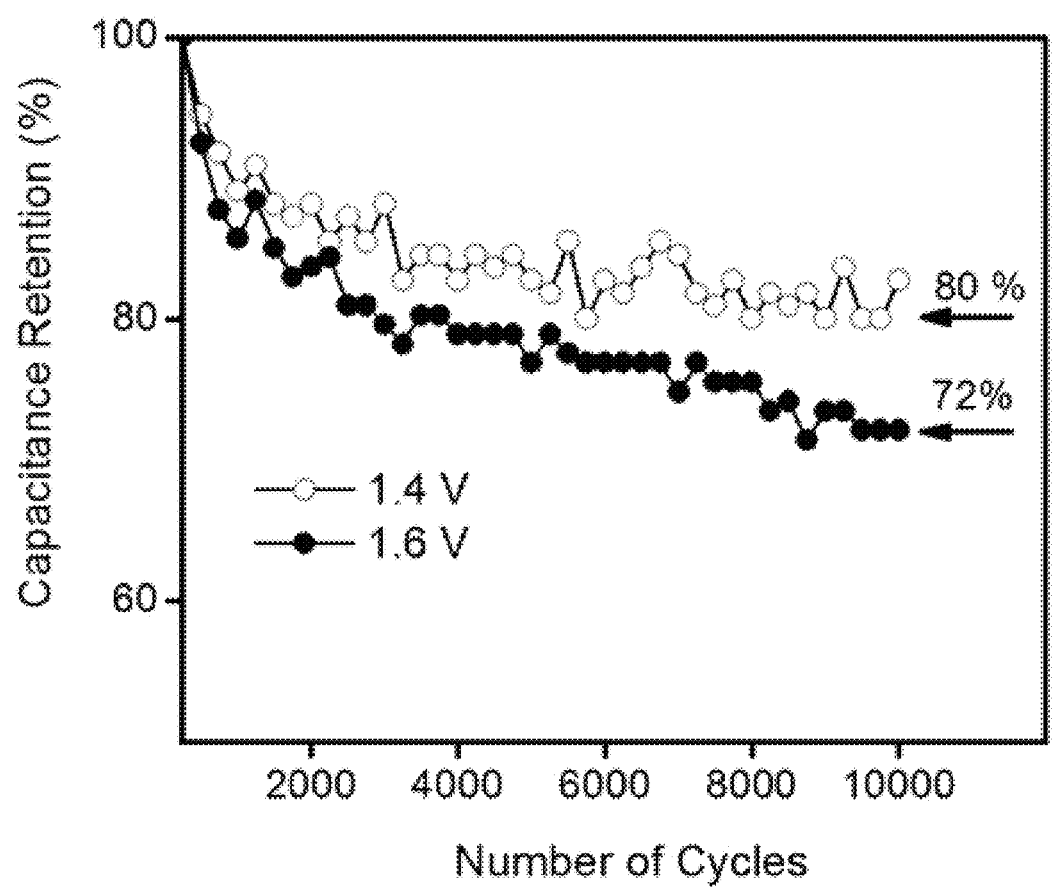
FIG. 6 is a plot of capacitive retention vs. number of cycles of various button-cells using $Mn_3O_4$ nanoparticles as electrode materials.

FIG. 6 shows the capacitive stability of $Mn_3O_4$ nanoparticles prepared according to the procedure above at charged voltages of 1.4 and 1.6 V measured via two-electrode button cell. After 10,000 charge-discharge cycles, $Mn_3O_4$ electrode shows a superior cycle life, with nearly 80% and 72% capacitive retention at 1.4 V and 1.6 V, respectively.

Figure 7:
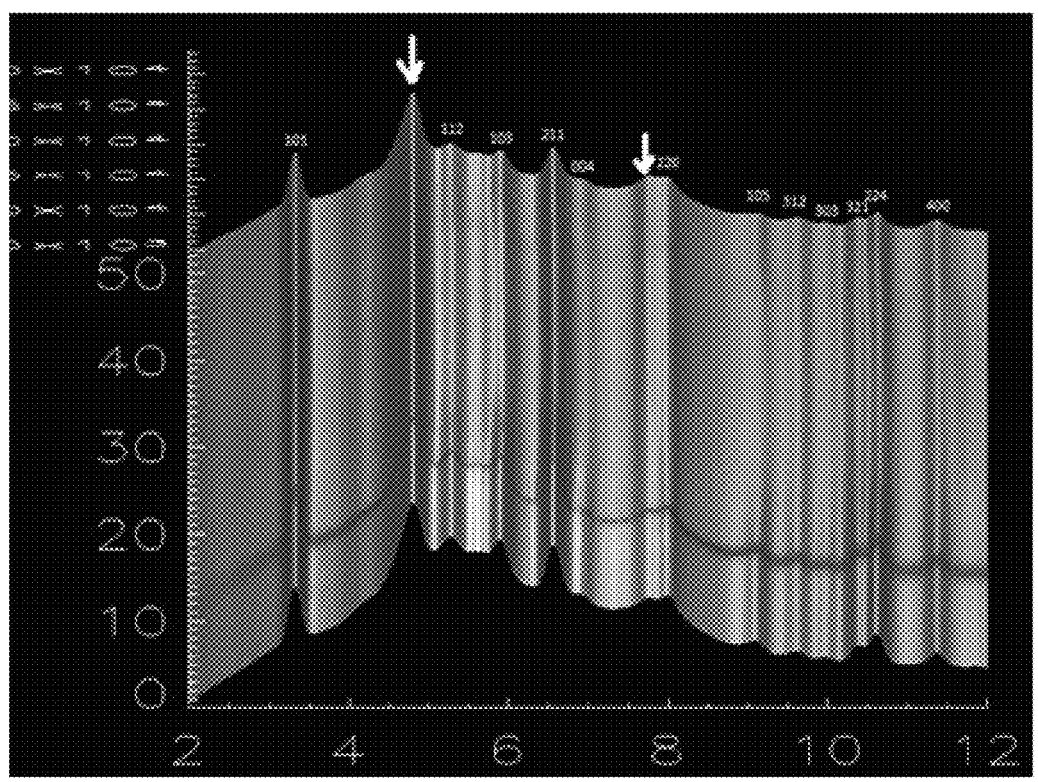
FIG. 7 is a plot of in situ XRD data of $Mn_3O_4$ during the charge-discharge measurement, showing a stable structure of $Mn_3O_4$ spinel during the cycling.

FIG. 7 shows a series of XRD patterns of $Mn_3O_4$ nanoparticles measured during the cyclic voltammetry measurements from 0 V to 1.2 V at a scan rate of 1 mV/second. This in situ measurement can reflect the changes occurring during the fast charge/discharge processes. The data show that overall crystalline structure of $Mn_3O_4$ remains stable between potential windows from 0 V to 1.2 V during the charge-discharge processes.

Figure 8:
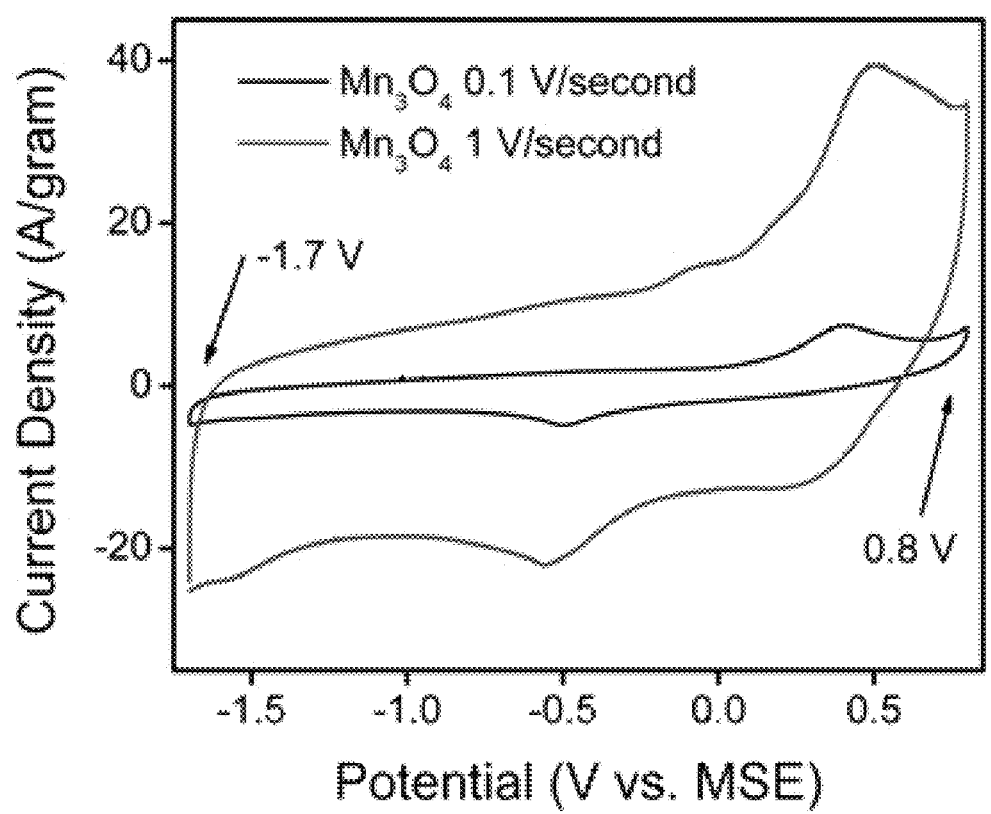
FIG. 8 is a plot of cyclic voltammetry measurements of $Mn_3O_4$ nanoparticles with a stable potential window of 2.5 V (from −1.7 V to 0.8 V vs mercury sulfate reference electrode [MSE]) in an aqueous $Na_2SO_4$ electrolyte at scan rates of 0.1 V/second and 1 V/second.

FIG. 8 shows that cyclic voltammetry measurements of $Mn_3O_4$ nanoparticles, prepared according to the procedure above in paragraph 23, in a 0.1M $Na_2SO_4$ aqueous electrolyte using a three-electrode half-cell with scan rates of 0.1 V/second and 1 V/second. The data clearly show a stable potential window of 2.5 V (from −1.7 V to 0.8 V vs MSE) without a distinct oxygen evolution reaction at higher potential ranges and hydrogen evolution reaction at lower potential ranges, which has not been reported by far.

Figure 9A:
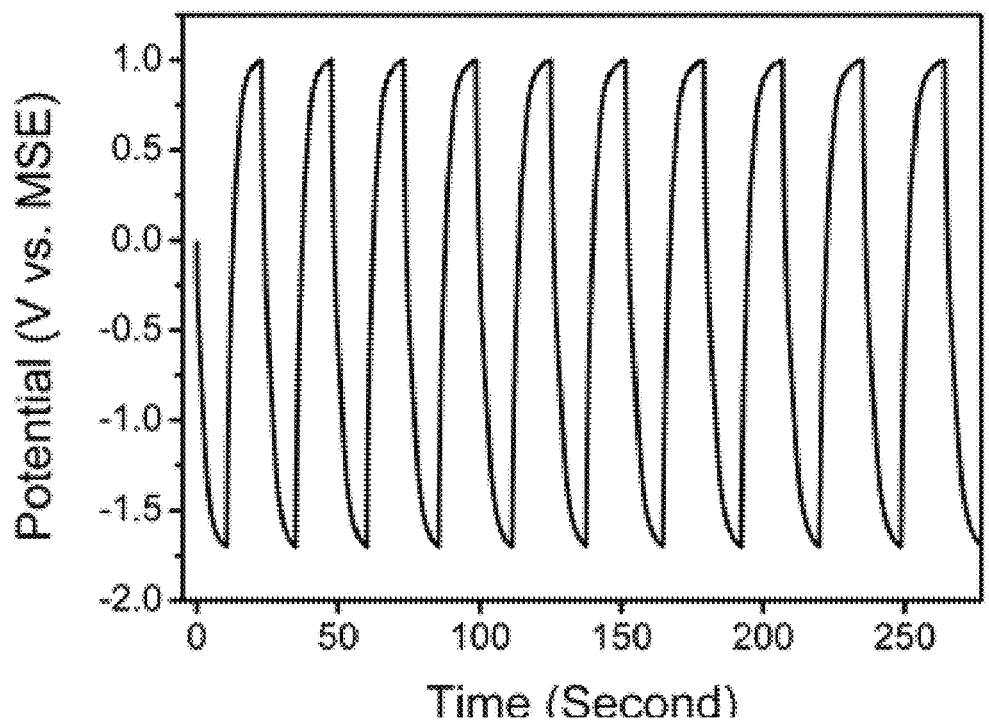
FIGS. 9A and 9B are plots of chronopotentiometric measurements of $Mn_3O_4$ nanoparticles with a stable potential window of 2.7 V (from −1.7 V to 1.0 V vs. MSE) in an aqueous $Na_2SO_4$ electrolyte with charge-discharge current density of 10 A/gram in a half-cell.
Figure 9B:
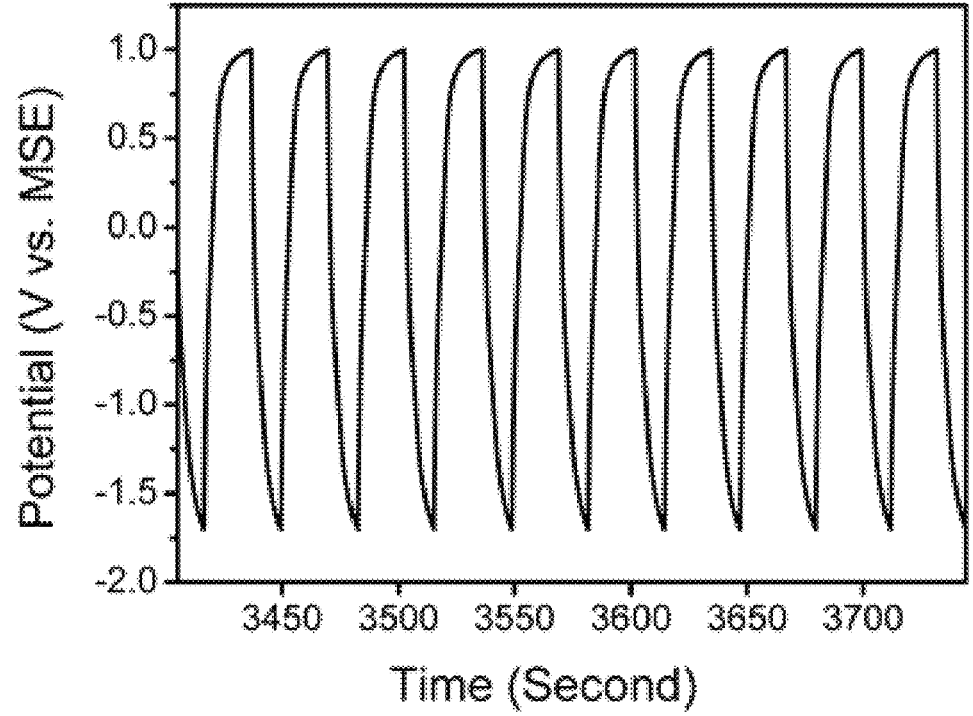

Similarly, FIG. 9 shows chronopotentiometric measurements of $Mn_3O_4$ nanoparticles measured using a three-electrode half-cell in a 0.1M $Na_2SO_4$ aqueous electrolyte. Data show that when a charge-discharge current density of 10 A/gram was applied, a stable potential window can be reached up to 2.7 V (from −1.7 V to 1.0 V). The data show that the 1st to 10th charge-discharge cycles are very similar to the 91st to 100th charge-discharge cycles, indicating a negligible degradation of $Mn_3O_4$ nanoparticles electrode during cycling between a 2.7 V potential-window.

Thus, the compositions prepared according to the methods described herein exhibit one or more of the following advantageous properties that makes them good candidates for electrode components: (1) the particle size of the compositions is relatively homogeneous within the range of about 10 nm-30 nm; (2) the compositions are prepared from relatively inexpensive and non-toxic raw materials that are relatively abundant and easy to procure; (3) the nanoparticles are preferably of high purity (95% to 100%) of $Mn_3O_4$ or $Co_xMn_{3-x}O_4$ (x is preferably 0.1, 0.5) or $Ni_xMn_{3-x}O_4$ (x is preferably 0.1, 0.5 or 0.75) that makes them particularly suitable for electrodes; (4) the manufacturing process is relatively fast (within few hours), amenable to scale up, conducted under ambient atmosphere and pressure, and relatively low temperature (thermal treatment at 50° C. to 200° C.), and do not require organic solvents to form the nanoparticle crystals; (5) the manufacturing process may be easily converted from batch to continuous production set-up; and (6) the $Mn_3O_4$, $Co_xMn_{3-x}O_4$ (x is preferably 0.1, 0.5) and $Ni_xMn_{3-x}O_4$ (x is preferably 0.1, 0.5, 0.75) nanoparticle prepared according to the procedures herein can be used as effective electrode materials for aqueous phase energy storage devices including batteries and electrochemical capacitors. Energy storage devices using such electrode materials are safe and inexpensive, can work at relatively wide voltage window (2.5 V to 2.7 V) with very long cycle life, such as above 10000 cycles.

From the above it may be readily appreciated that the present invention also applies to the preparation of manganese nanoparticles for electrodes comprising mixed-valence manganese oxide of the formula $MnO_x$, wherein Mn has an oxidation state of 2+, 3+ and 4+ and the value of x is within the range between 1 and 2 (1<x<2). In terms of molar percent, preferably 40% to 60% of Mn has the valence of 4+, preferably 10% to 20% of Mn has the valence 3+ and preferably 20% to 40% of Mn has the valence of 2+. In addition, the present invention also applies to mixed valence cobalt doped MnOx where the manganese and cobalt are present at a valence state of 2+, 3+ and 4+ or to mixed valence nickel doped MnOx where the manganese is present at a valence state of 2+, 3+ and 4+ and nickel is present at a valence state of 2+.

More specifically, one may preferably prepare a Co doped MnOx of the formula $Co_yMn_{3-y}O_x$ where y has the value of 0.1 or 0.5 and 3<x<6. One may also preferably prepare a Ni doped $MnO_x$ of the formula $Ni_yMn_3O_x$ where y has the value 0.1, 0.5 and 0.75 and 3<x<6. In the Co doped MnOx both Co and Mn are present in a mixed valence state of 2+, 3+ and 4+. In the Ni doped MnOx the Mn is present at a mixed valence state of 2+, 3+ and 4+ and the Ni is present at a valence state of 2+.

Preferably, the mixed valence oxide MnOx nanoparticles, the Co doped MnOx nanoparticles (Co—MnOx) and/or the Ni doped MnOx nanoparticles (Ni—MnOx) are prepared according the following general reaction scheme in a semi-batch reactor:

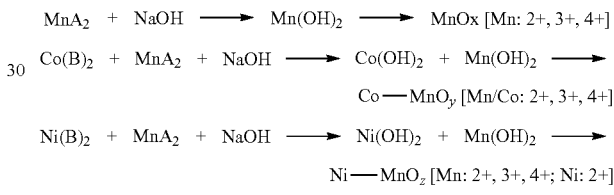

In the above equation, A may be any halide such as Cl⁻ or $(NO_3)^-$. The alkali base may preferably be NaOH but may include any other suitable alkali, such as KOH. The resulting product is collected via centrifuge, air-dried, followed by a mild temperature calcination (thermal treatment in air or oxygen) at temperatures of 200° C. to 400° C. (225-275° C. is preferred). In the above x is within the range between 1 and 2 (1<x<2), y is within the range between 2 and 4 (2<y<4), and z is within the range between 2 and 3 (2<z<3). In terms of molar percent, of Co-doped MnOx preferably 40% to 60% of Co has the valence of 4+, preferably 10% to 20% of Co has the valence 3+ and preferably 20% to 40% of Co has the valence of 2+; of Ni-doped MnOx, Ni always has the valence of 2+.

In the semi-batch reactor, which is reference to a reactor that allows for reactant addition or product removal over time, the alkali base solution such as NaOH is preferably injected into the reactor containing the identified Mn (and/or Ni and Co) precursors in a relatively slow and controlled injection rate. More specifically, the alkali base solution is preferably injected at an injection rate from 0.1 mL/min to 100 mL/min with respect to a preferred reactor size of 50 ml to 50 liters. Thus, nucleation of $Mn(OH)_2$ is preferably controlled by the injection rate of the alkali base solution and as a consequence. It is noted that under the preferred conditions of normal atmospheric conditions and room temperature (e.g. 20° C. to 30° C.), dissolved oxygen gas in the water present (with a preferred saturation concentration of 0.27 mM) will oxide the $Mn(OH)_2$ and or $Ni(OH)_2$ and $Ni(OH)_2$ into mixed valence oxides with valences of 2+, 3+ and 4+. The oxide product is collected via centrifuge, air-dried, followed by a mild temperature calcination (thermal treatment in air or oxygen) at temperatures of 200° C. to 400° C. (225-275° C. is preferred). The final products can be readily prepared with an average nanoparticle size of 10 nm to 50 nm. The particles herein, which may therefore include the mixed valence oxide MnOx or the corresponding doped mixed valence oxide Co—MnOx and/or Ni—MnOx, preferably have an average particle size of 20 nm with a variation of +/−7 nm. Such size recitation is reference to particle diameter.

Figure 10:
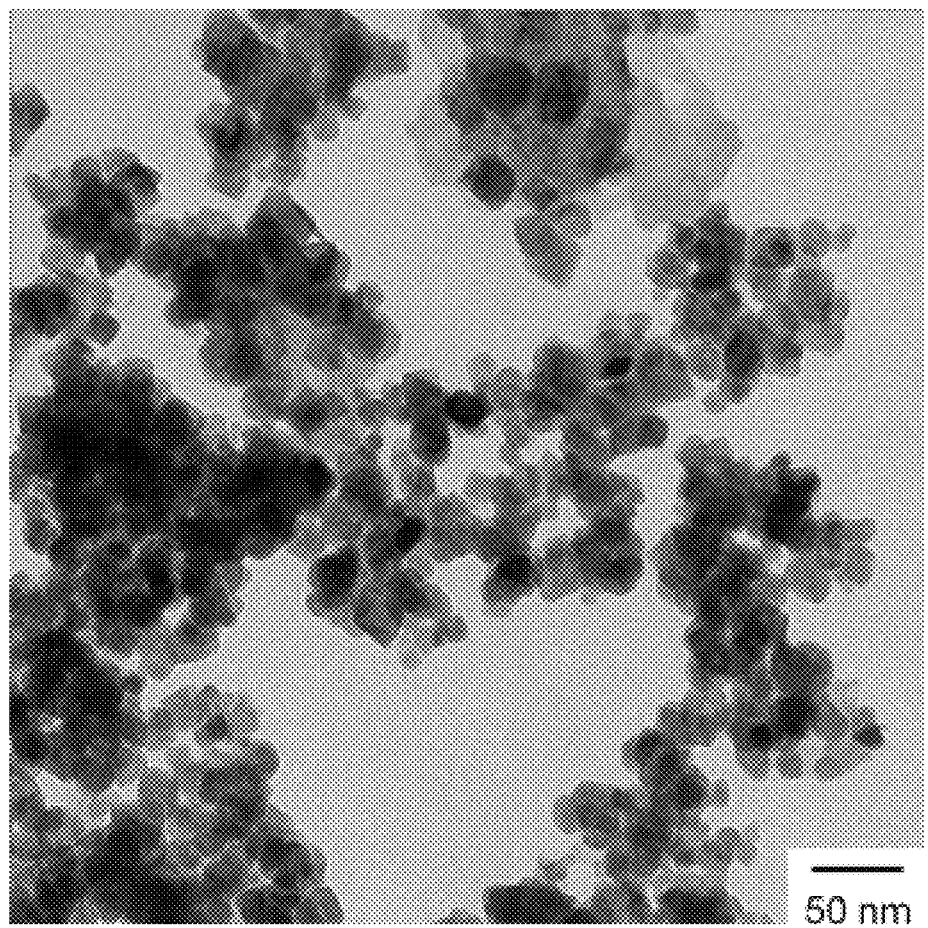
FIG. 10 is a TEM image of the mixed valence oxide herein MnOx.
Figure 11:
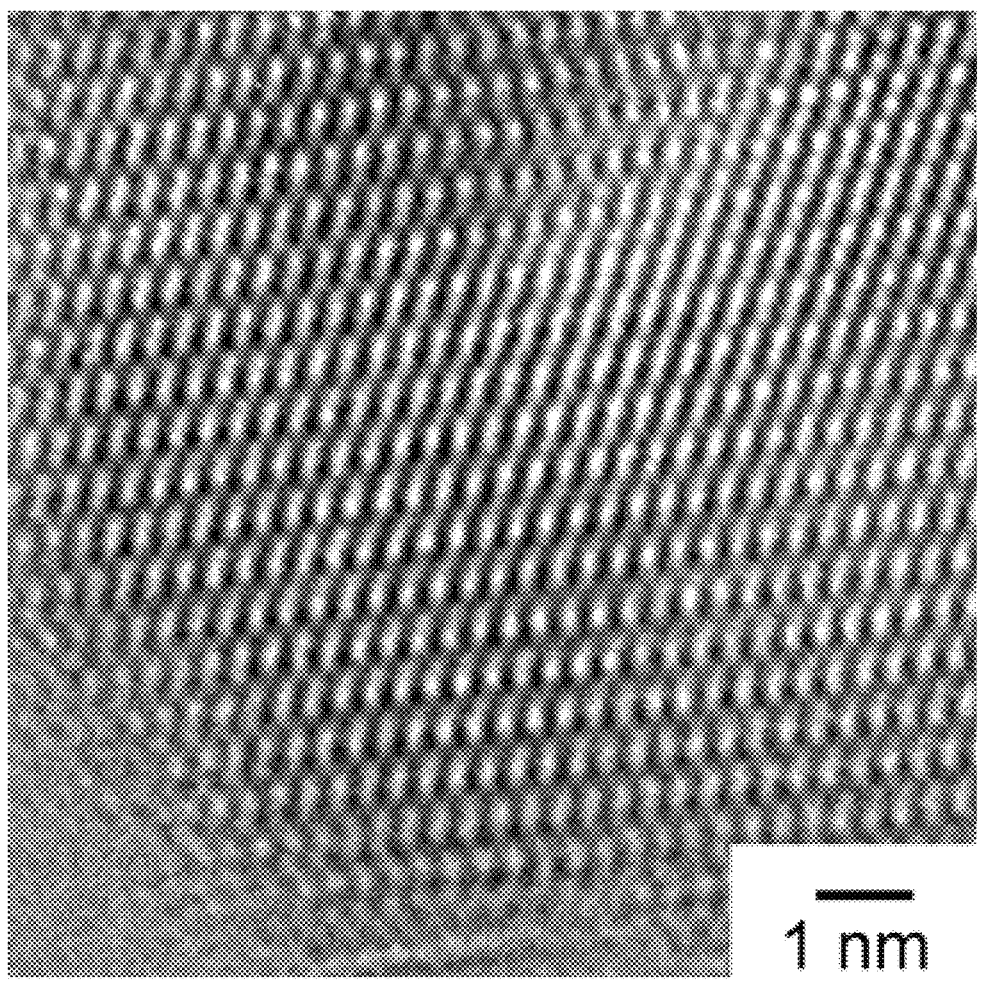
FIG. 11 is a relatively higher resolution TEM image of the mixed valence oxide MnOx.

In connection with the above, reference is now made to FIG. 10 which shows a TEM image of the mixed valence oxide MnOx, FIG. 11 providing a relatively higher resolution view of such oxide. FIG. 12A is a TEM image of the mixed valence oxide with cobalt doping comprising $Co_{0.1}Mn_{2.9}Ox$. FIG. 12B is a TEM image of the mixed valence oxide with nickel doping comprising $Ni_{0.1}Mn_{2.9}O_x$.

Figure 13:
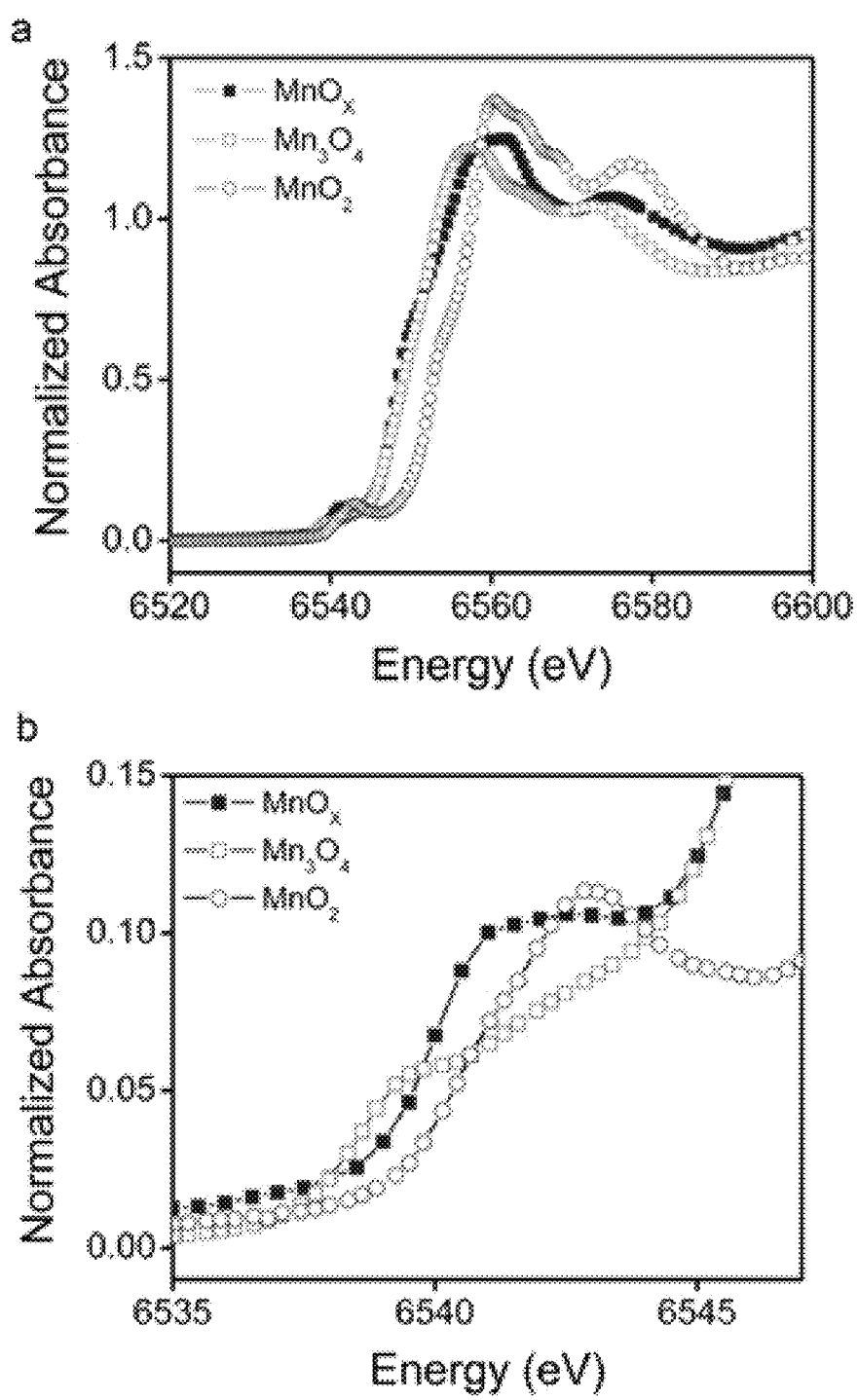
FIG. 13 identifies graph (a) a complete and graph (b) pre-edge feature of X-ray absorption near edge structures (XANES) spectra of mixed valence manganese oxide (MnOx) and commercial $Mn_3O_4$ (with a size large than 200 nm) and $MnO_2$ bulk at Mn K edge.
Figure 14:
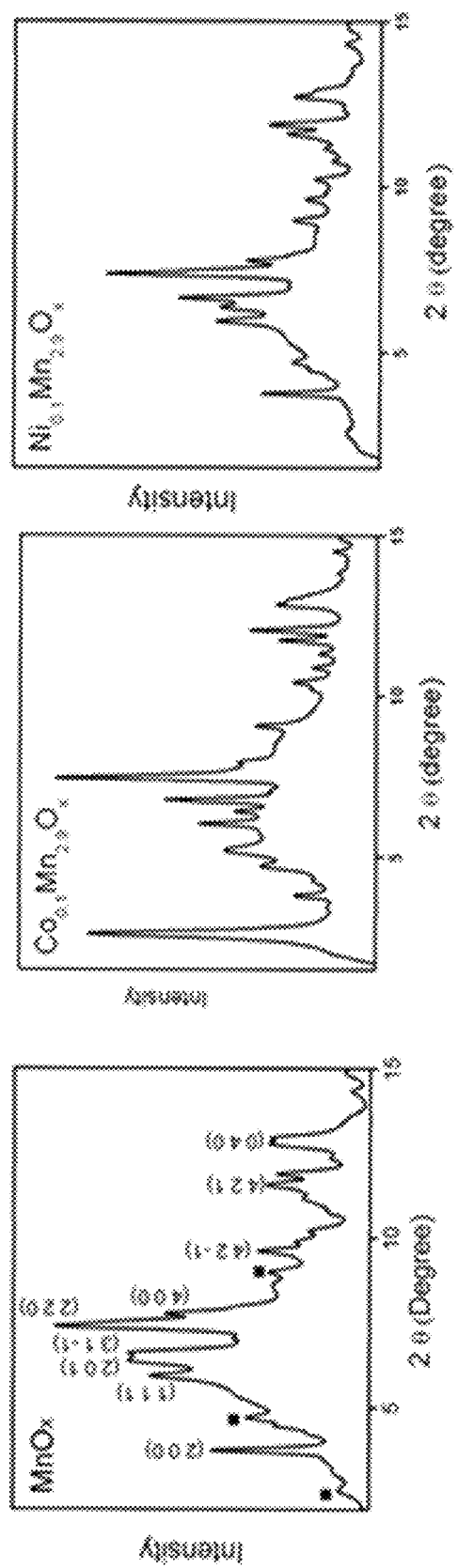
FIG. 14 identifies X-ray diffraction diagrams (XRD) of the identified mixed valence oxides MnOx, $Co_{0.1}Mn_{2.9}Ox$ and $Ni_{0.1}Mn_{2.9}O_x$.
Figure 16:
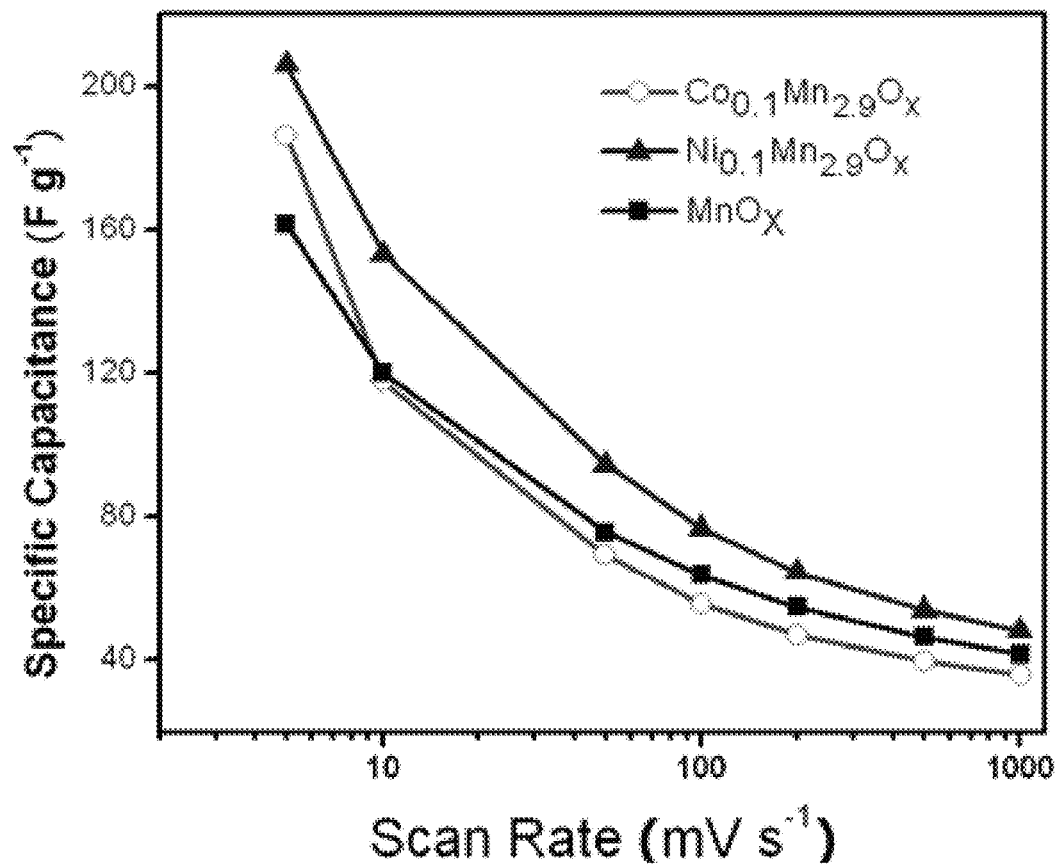
FIG. 16 illustrates capacitance vs. scan rates of $MnO_X$, $Ni_{0.1}Mn_{2.9}O_x$ and $Co_{0.1}Mn_{2.9}O_x$ from half-cell cyclic voltammetry measurements.
Figure 17:
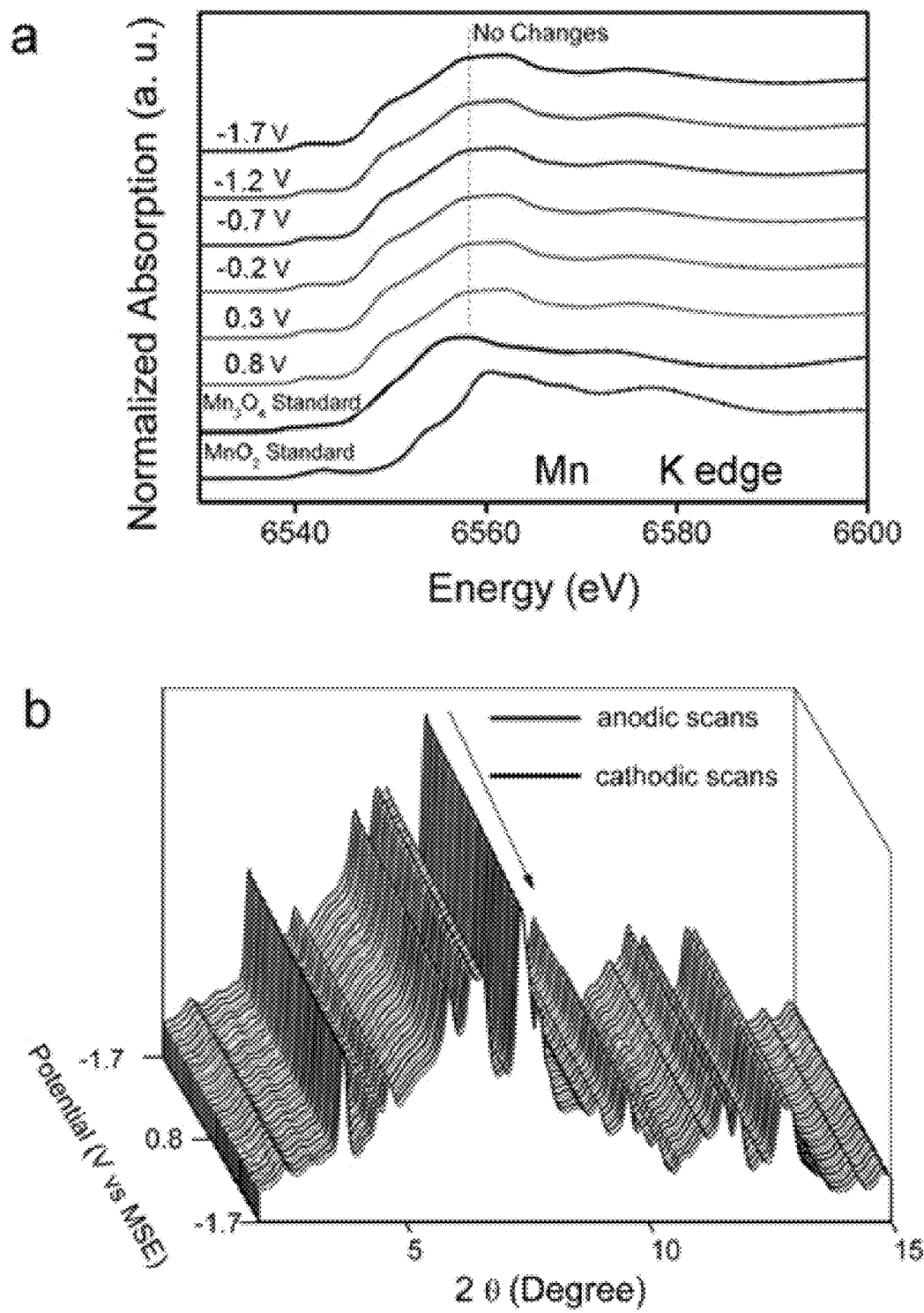
FIG. 17 illustrates in situ (a) XANES and (b) XRD data of $MnO_x$ during the charge-discharge measurement, showing a stable crystalline and electronic structure during the identified cycling.

FIG. 13 shows that mixed valence manganese oxides prepared herein with normalized absorbance as indicated in which Mn valence positions between commercial $Mn_3O_4$ bulk materials (with a diameter larger than 200 nm) and $MnO_2$ bulk materials (with a diameter larger than 1000 nm). This is considered to therefore confirm that Mn in the recited MnOx herein has a valence of 2+, 3+ and 4+. FIG. 15 provides evidence that the mixed valence oxide MnOx herein can be operated within a potential window of 2.5 V in a half-cell, while commercial $Mn_3O_4$ bulk materials can only be prepared with a potential window of 1.2 V in the half-cell.

Electrode materials of the mixed valence oxides of MnOx [Mn: 2+, 3+, 4+], Co—MnOx [Mn/Co: 2+, 3+, 4+] and/or Ni—MnOx [Mn: 2+, 3+, 4+; Ni: 2+] can be conveniently prepared by mixing 60% to 90% weight percent (preferably 80%) of MnOx, Co—MnOx or Ni—MnOx nanoparticles with 10% to 40% weight percent (preferably 15%-25% by weight) of carbon black (commercial carbon black with sizes ranging from 30 nm to 100 nm and a surface area of 75 $m^2$/gram) and then copious amount of water to form final ink slurry. In a typical preparation, 0.8 gram of MnOx, Co—MnOx or Ni—MnOx nanoparticles and 0.2 gram of acetylene carbon black are mixed with about 3 gram of water, and sonicated for 15 minutes to form the ink slurry.

Figure 18:
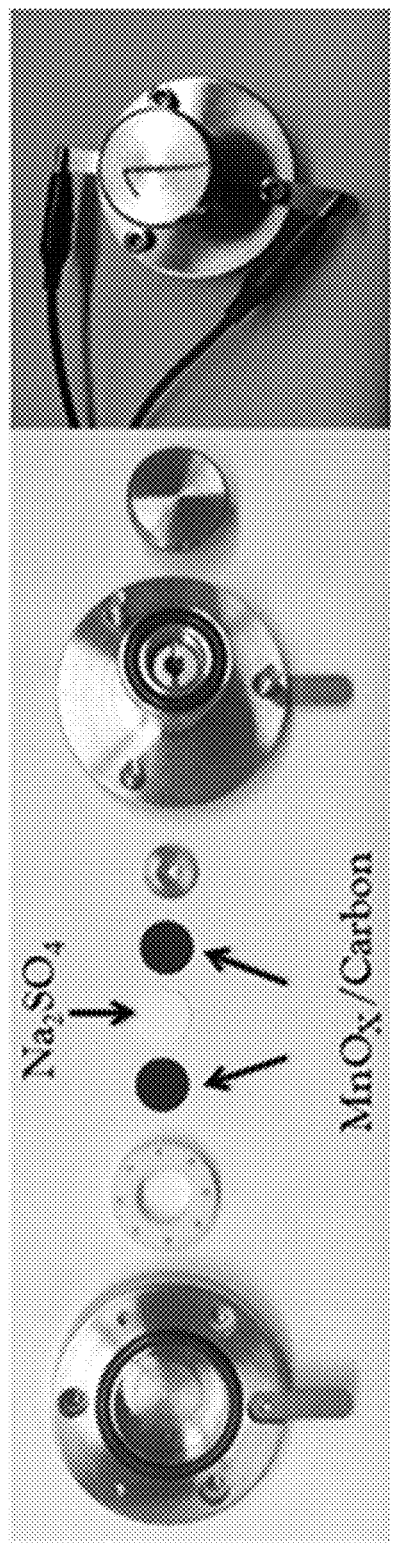
FIG. 18 illustrates a configuration of a symmetric button-cell. Loading of each electrode includes 4 mg MnOx and 1 mg carbon, and a total of 300 uL of 1M $Na_2SO_4$ is added. Loading density is around 3 mg/cm² for each electrode.
Figure 19:
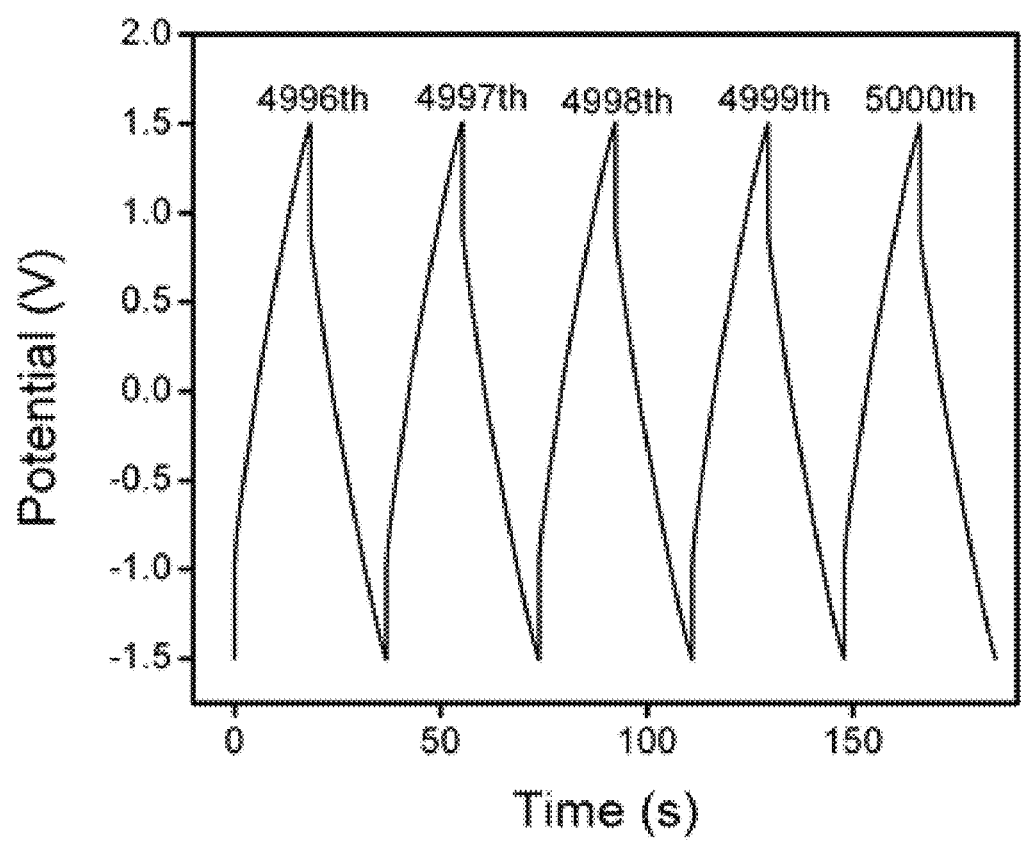
FIG. 19 illustrates galvanostatic cycles (from 4996th cycle to 5000th cycle) of the $MnO_X$ button-cell at a current density of 10 A/g with a stable potential window of 3.0 V (from −1.5 V to 1.5 V). Symmetric button-cell with a configuration of $MnO_X$/$Na_2SO_4$/$MnO_X$ was applied. Loading includes 4 mg $MnO_X$, 1 mg carbon, and 300 uL of 1 M $Na_2SO_4$. The loading density is around 3 mg/cm².

Similar to the above, an aqueous energy storage device can be prepared with the mixed valence oxides of MnOx, Co—MnOx and/or Ni—MnOx, which again involves the aforementioned two current collectors and a separator. A carbon black/metal oxide composition is prepared as described above and deposited on one side of each current collector, where the metal oxide is now, as noted, mixed valence oxides of MnOx, Co—MnOx and/or Ni—MnOx. For a symmetric button cell (in which the anode and cathode are identical), as shown in FIG. 18, such may preferable include 4 mg of MnOx and 1 mg carbon and 300 uL of $Na_2SO_4$ is added as the electrolyte solution. FIG. 19 identifies the galvanostatic cycles showing that a stable potential window of 3.0 V in which the potential of the button-cell changes from −1.5V to 1.5V with respective to time while keeping a constant output current density of 10 A/g.

Figure 20:
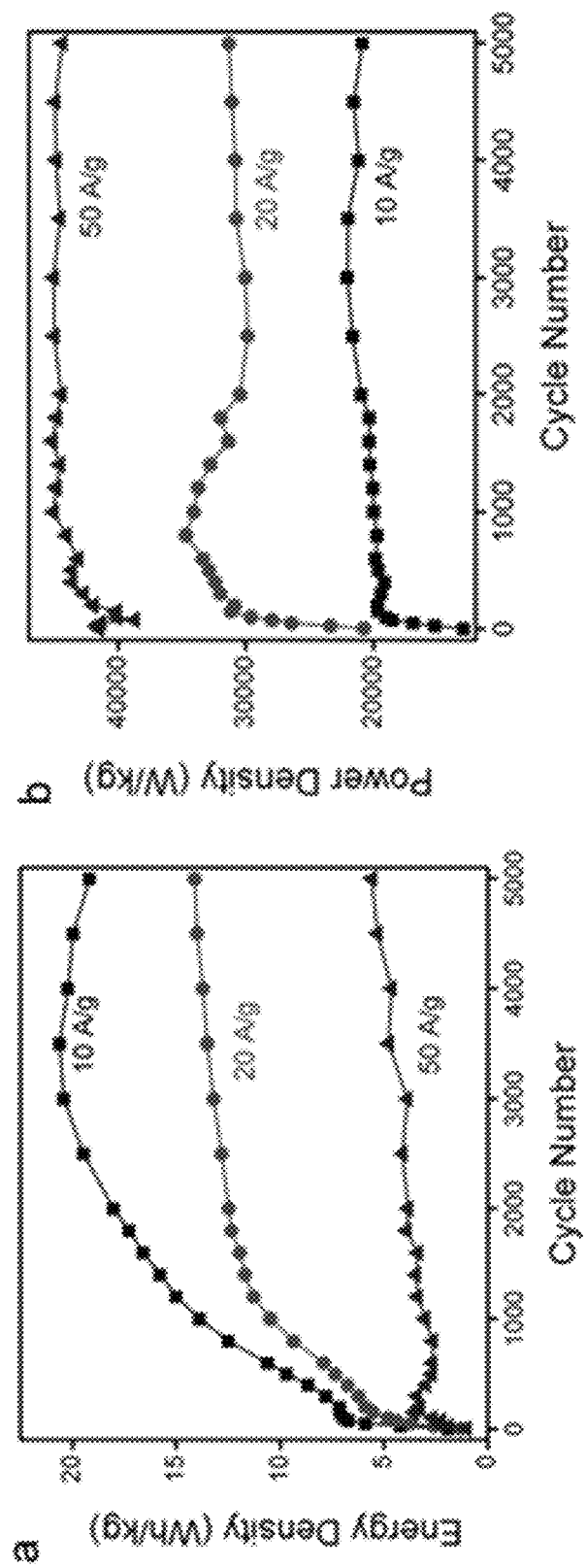
FIG. 20 illustrates in graph (a) energy density and (b) power density of the $MnO_X$ button-cell at current density of 10, 20 and 50 A/g for 5,000 charge-discharge cycles.

FIG. 20, identifies in graph (a) the energy density and in graph (b) the power density of the mixed valence oxide herein MnOx button cell at current density of 10, 20 and 50 A/g for 5,000 charge/discharge cycles. Accordingly, a relatively long cycle life is observed for the mixed valence oxides herein and it is contemplated that the mixed valence oxides herein of MnOx and/or Co—MnOx and/or Ni—MnOx will be on the order of up to and including 10,000 charge/discharge cycles, and higher, such as up to 20,000 cycles.

As can be appreciated from the above, the present disclosure reveals an improvement to the potential window of electrochemical energy storage systems in the present of an aqueous electrolyte, which is an important feature to designing new electrochemical energy storage devices to provide high energy and power densities, good reliability and relatively low cost compared to existing lithium ion battery use. In the present invention, among other things, a new synthesis is identified for a mixed valence manganese oxide (and cobalt- and nickel-doped mixed valence manganese oxide) nanoparticles that indicated relatively high overpotential (larger than 0.6 V) to hydrogen and oxygen evolution reactions in the presence of an electrolyte. Beyond the thermodynamic potential window of water (1.23V), the mixed valence manganese oxide nanoparticles demonstrated potential windows of 2.5V in the half-cell and 3.0V in a symmetric button cell. This demonstrates excellent energy density, power density and columbic efficiency after upwards of about 20,000 charge-discharge cycles.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A composition comprising nanoparticles of mixed valence oxides of the formula MnOx wherein Mn consists of a mixture of valence states of 2+, 3+ and 4+ where x has a value between 1 and 2 and having an average particle size of 10 nm to 50 nm, wherein Mn 4+ is present at a level of 40 mole percent to 60 mole percent, Mn 3+ is present at a level of 10 mole percent to 20 mole percent and Mn 2+ is present at a level of 20 mole percent to 40 mole percent and wherein said nanoparticles of mixed valence oxides is combined with carbon black and is in the form of an electrode that indicates a potential window of 2.5V in an aqueous electrochemical half-cell.

2. The composition of claim 1 wherein said mixed valence oxide MnOx is doped with Ni to provide the doped mixed valence oxide Ni—MnOx wherein Mn has a mixture of valence states of 2+, 3+ and 4+ and Ni has a valence of 2+.

3. The mixed valence oxide of claim 2 wherein said Ni doped mixed valence oxide has the formula $Ni_yMn_{3-y}O$ where y has the value 0.1, 0.5 and 0.75 and 3<x<6.

4. The composition of claim 1 wherein said composition is a mixture of 10% to 40% by weight of carbon black and 60% to 90% by weight of said MnOx particles.

5. The composition of claim 2 wherein said composition is combined with carbon black to provide a mixture of 10% to 40% by weight of carbon black and 60% to 90% by weight of said doped mixed valence oxide Ni—MnOx.

6. The composition of claim 5 wherein said composition is in the form of an electrode.

7. An electrochemical cell comprising:
two current collectors having deposited thereon a composition comprising 10-40% by weight of carbon black and 60-90% by weight of MnO, nanoparticles having particle size of 10 to 50 nm wherein Mn consists of a mixture of valence states 2+, 3+ and 4+ and 1<x<2;

a separator; and an electrolyte comprising an aqueous solution of an alkali salt, wherein Mn 4+ is present at a level of 40 mole percent to 60 mole percent, Mn 3+ is present at a level of 10 mole percent to 20 mole percent and Mn 2+ is present at a level of 20 mole percent to 40 mole percent and wherein said nanoparticles of mixed valence oxides is combined with carbon black and is in the form of an electrode that indicates a potential window of 2.5V in an aqueous electrochemical half-cell.

8. The electrochemical cell of claim 7, wherein said MnOx nanoparticles are doped with Ni and comprise the doped mixed valence oxide Ni—MnOx wherein Ni is present at a valence of 2+.

9. A method of preparing MnOx nanoparticles comprising:

(a) supplying a manganese (II) salt of the formula $Mn(A)_2$ where A is any halide or a $NO_3^-$;

(b) reacting said manganese (II) salt with an alkali base in air and forming said MnOx nanoparticles; and (c) heating said nanoparticles at a temperature of 200° C.-400° C. and recovering MnOx nanoparticles at a particle size of 10 nm to 50 nm wherein Mn has a mixture of valence states of 2+, 3+ and 4+ and where x has a value between 1 and 2.

10. A composition comprising nanoparticles of mixed valence oxide Co—MnOx wherein Mn and Co consist of a mixture of valence states of 2+, 3+ and 4+ where x has a value between 1 and 2 and having an average particle size of 10 nm to 50 nm wherein said nanoparticles of mixed valence oxides is combined with carbon black and is in the form of an electrode that indicates a potential window of 2.5V in an aqueous electrochemical half-cell.

11. The composition of claim 10, wherein said composition is a mixture of 10% to 40% by weight of carbon black and 60% to 90% by weight of said doped mixed valence oxide Co—MnOx.

* * * * *

UNITED STATES PATENT AND TRADEMARK OFFICE
CERTIFICATE OF CORRECTION

PATENT NO. : 10,468,684 B2  
APPLICATION NO. : 14/737823  
DATED : November 5, 2019  
INVENTOR(S) : Xiaowei Teng Page 1 of 1

It is certified that error appears in the above-identified patent and that said Letters Patent is hereby corrected as shown below:

In the Claims

In Column 10, Line 51: In Claim 3, delete "$Ni_yMn_{3-y}O$" and insert -- $Ni_yMn_{3-y}O_x$ --, therefor.

In Column 10, Line 65: In Claim 7, delete "MnO," and insert -- $MnO_X$ --, therefor.

Signed and Sealed this  
Twenty-eighth Day of January, 2020

Andrei Iancu  
*Director of the United States Patent and Trademark Office*